July 23, 1968
J. HUANTE
3,393,698
EMERGENCY FUEL TANK
Filed Feb. 9, 1966
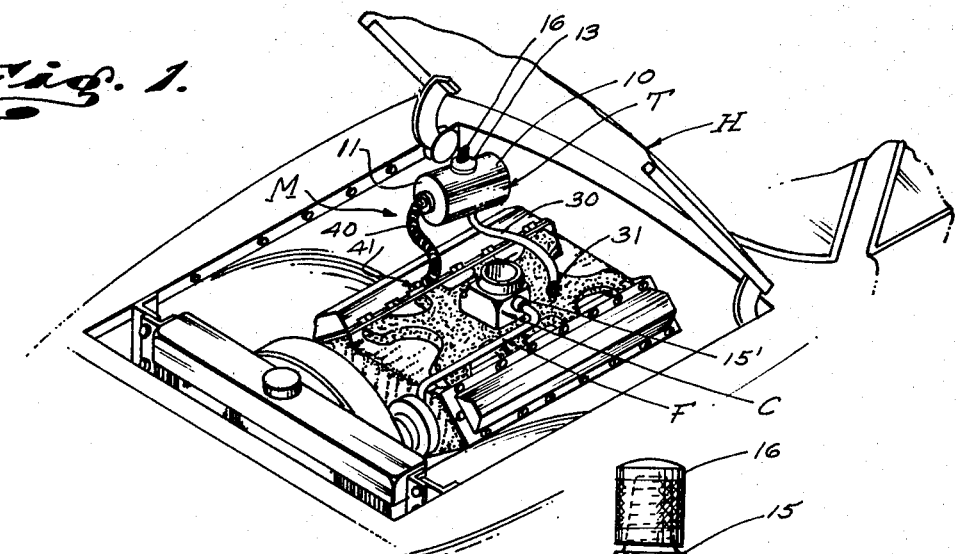
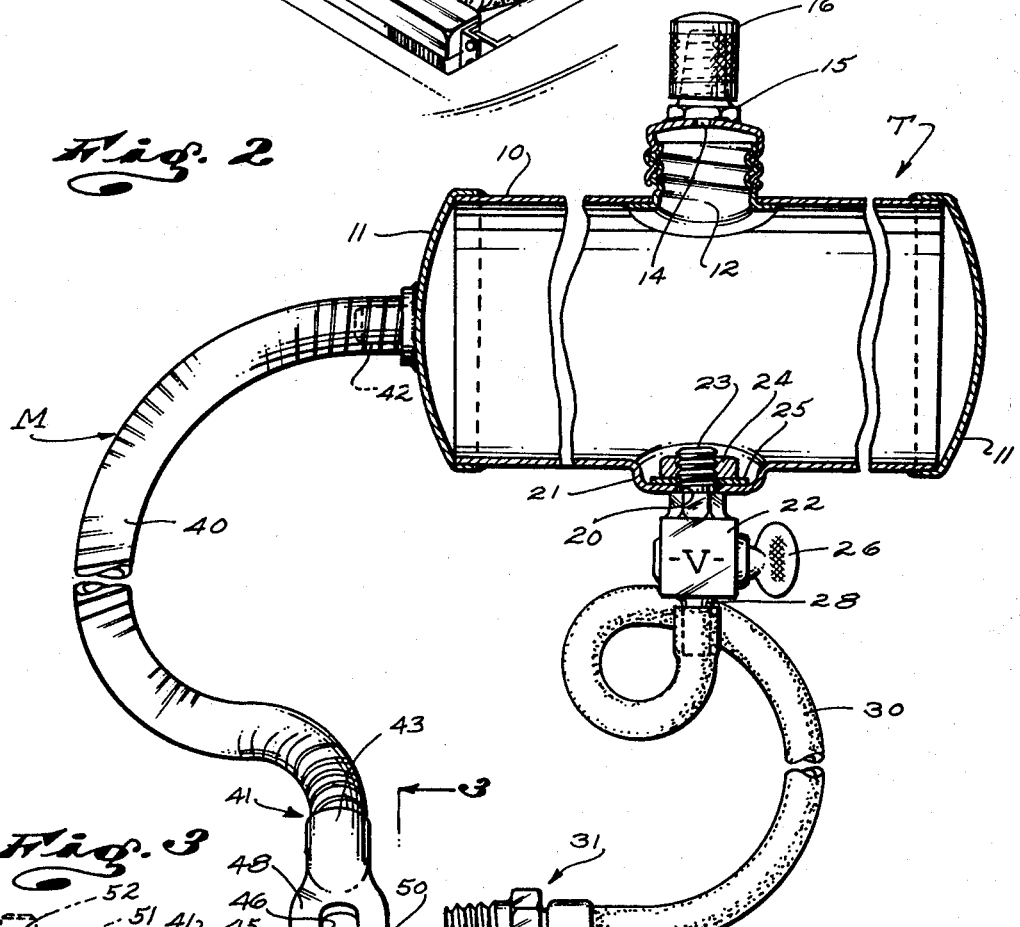
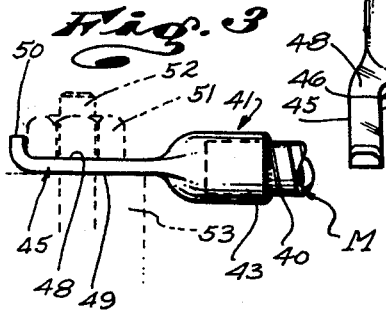
Inventor
Jesus Huante
By
Georges A. Maxwell
Attorney

United States Patent Office 3,393,698
Patented July 23, 1968

3,393,698
EMERGENCY FUEL TANK
Jesus Huante, 4816 Oak St.,
Pico Rivera, Calif. 90660
Filed Feb. 9, 1966, Ser. No. 528,337
10 Claims. (Cl. 137—376)

ABSTRACT OF THE DISCLOSURE

An emergency fuel tank having an upwardly projecting filler neck at its top side of the tank, a closure closing the neck, an outlet opening at the bottom side of the tank, an elongate flexible fuel conducting hose, means coupling one end of the hose to the outlet opening, a male fuel line connector fitting at the other end of the hose to engage in the fuel inlet opening in a carburetor and mounting means to mount the tank in the engine compartment in a motor vehicle and including an elongated flexible column, anchoring means securing one end of the column to the tank and a mounting head fixed to the other end of the column, said mounting head being a flat mounting tab adapted to be engaged between the mounting surfaces of a support structure and a related screw fastener within the engine compartment.

---

This invention has to do with a fuel tank and is more particularly concerned with a small, compact, spare or emergency fuel tank for use in connection with gasoline powered internal combustion engines and the like.

In the automotive art or industry, automobiles and other similar vehicles are provided with gasoline powered internal combustion engines. The gasoline in the ordinary vehicle is stored in a tank provided in the vehicle remote from the engine and is pumped from the tank by means of a suitable engine-driven pump to a carburetor on the engine.

Each day many vehicles, such as referred to above, break down or for one of several reasons fail to operate properly and stall. Ordinarily, such break-down or stalling of vehicles occurs when the vehicles are on roadways and with the result that the stalled vehicles create serious traffic problems.

With the ever-increasing number of vehicles and with the number of vehicles becoming concentrated, the stalling and breaking down of vehicles, in traffic, has become a very serious problem.

In areas such as the greater Los Angeles basin, where the number of vehicles is great, there is a serious shortage of servicemen and the necessary equipment, such as tow trucks and the like, to care for all of the breakdowns that occur on the roadways and freeways during the morning and evening hours when the greatest number of vehicles are in use. As a result, large numbers of vehicles are to be found stalled at the sides of the freeways and the like. Often times, such vehicles remain stalled and create a continuing obstacle to traffic for several hours before assistance can be rendered. It has been determined that when a serviceman, with a truck and other suitable equipment, reaches a stalled automobile, every effort is made by the attending mechanic or servicemen to start the vehicle so as to avoid the necessity of towing the vehicle away. Every effort is made to avoid the necessity of towing the vehicle away as such towing operations are difficult and create new and serious traffic problems. Further, since time is of the essence in such situations, and since a towing operation is in itself a time-consuming operation, every effort is normally made to start a stalled vehicle.

As a result of the above, it is not infrequent that a mechanic or serviceman will spend or waste fifteen or twenty minutes trying to get a vehicle started and running, before resorting to towing the vehicle away to a shop where the cause of breakdown can be corrected.

It has been determined that if half of the stalled vehicles could be made to run or operate in less than five minutes after a serviceman arrives on the scene, the number of service trucks now available in the greater Los Angeles area (for example) would be able to adequately handle all calls for such service in a matter of minutes, materially relieving the traffic problems presently created by stalled vehicles and eliminating the necessity for persons in need of service to wait for prolonged periods of time for such service.

It has been further determined that the three most common causes of stalled vehicles are: first, they run out of gas; secondly, vapor locks develop in the fuel line; and, third, fuel pump failure occurs.

At least three-quarters of all stalled vehicles stall as a result of one of the above causes.

It can be easily and quickly determined that one of the three noted causes will be found, but it is often difficult and/or time-consuming to determine which of these three causes exists and to then, presently, correct it.

It is an object of my invention to provide a small emergency gasoline fuel tank that can be easily and quickly connected with the carburetor of a vehicle which has stalled as a result of fuel stoppage to the carburetor or as a result of running out of gas.

It is a further object of this invention to provide a fuel tank of the character referred to which is of such size and extent that it can be easily and conveniently arranged in the engine compartment of all standard or conventional motor vehicles to occur above the carburetor, whereby gasoline can be flowed or supplied to the carburetor, by gravity.

Still another object of this invention is to provide a fuel tank of the character referred to having novel mounting and supporting means, which means is such that the tank can be arranged and disposed within the engine compartment of a vehicle in any desired manner.

It is a further object to provide a mounting means which does not require the provision of any special clamps and the like and which does not require modifying any other structure, but rather, is such that it utilizes any one of the many existing screw fasteners to be found and which are accessible within the engine compartment of a vehicle, to make the structure fast.

Still further it is an object of my invention to provide a mounting means of the character referred to including a bifurcated mounting tab which is such that it can be easily and conveniently slid into engagement about the shank of a screw fastener, between the head of the fastener and its related piece of work, whereby the screw fastener selected to mount the construction need not be removed, but only loosened to permit relating the mounting means to it.

The various objects and features of my invention will be fully understood from the following detailed description of a typical preferred form and application of my invention, throughout which description reference is made to the accompanying drawings, in which:

FIG. 1 is an isometric view of an automobile engine compartment with a structure as provided by the present invention arranged therein;

FIG. 2 is a view of my new construction with portions thereof shown in section to better illustrate certain details of the construction; and FIG. 3 is taken substantially as indicated by line 30 on FIG. 2.

The structure provided by the present invention includes an elongate, normally horizontally extending can or tank T, formed of sheet metal and having a cylindrical side wall 10 and end walls 11.

In practice, the tank T can be fabricated in any desired manner and if necessary or desired, can be other than round or cylindrical in form.

The tank T is provided with an elongate upwardly extending externally threaded tubular filler neck 12. In the case illustrated, the filler neck 12 is a roll formed part engaged and mounted in an opening provided in the top of the side wall 10 of the tank, intermediate the ends thereof.

A suitable screw cap 13 is threadably engaged on and closes the top of the neck. The cap 13 is provided with a vent opening 14.

In the case illustrated, the cap is provided with an upwardly projecting, externally threaded tubular fitting 15, the threads of which correspond with the threads of a standard automotive male fuel line fitting. The fitting 15 is, in practice, a standard, male fuel line fitting soldered or raised through the top of the cap in axial alignment and communicating with the vent opening 14.

Engaged on the fitting 15 is a screw cap 16, which cap normally closes the fitting and the vent, to facilitate transporting and handling the tank without loss or spillage of fuel or gasoline therefrom.

When the construction is in use as will hereinafter be described, the cap 16 is removed from the fitting 15 to open the vent and is engaged on the male fitting 15' of the fuel line F of the vehicle to which the structure is related, to temporarily close or plug the fuel line F, in the event that fuel is caused to flow therefrom when the engine is set into operation.

In addition to the foregoing, the tank is provided with a downwardly disposed outlet opening 20 at the bottom of the side wall 10. In the case illustrated, the opening 20 is shown as being arranged intermediate the ends of the tank T and in axial alignment with the filler neck.

Further, if desired, the tank can, as illustrated, be formed with a downwardly projecting basin 21 with a flat bottom wall in which the opening 20 is provided.

Engaged in and communicating with the opening 20 is a normally closed manually operable valve V.

The valve V is shown as provided with a body 22 defining an upwardly disposed stop surface engaged against the top surface of the basin and an upwardly projecting externally threaded tubular inlet nipple 23 which projects upwardly through the opening 20 and into the interior of the tank.

A clamp nut 24 is engaged on the nipple, within the tank, to hold the valve in tight clamped engagement with the bottom wall of the basin.

A suitable washer 25 is provided between the nut and the adjacent wall of the tank to seal therebetween and prevent the leakage of fuel outwardly about the nipple 23.

In practice, the filler neck provides access to the interior of the tank to facilitate engagement of the nut on the nipple of the valve.

The valve V is further provided with a laterally outwardly projecting operating stem with a manually engageable head 26, in the nature of a thumb screw head.

Finally, the valve V is provided with a downwardly projecting tubular outlet nipple 28 on which the inner end of an elongate flexible fuel conducting line or hose 30 is engaged.

In practice, the hose or line 30 is established of rubber. In practice, however, if desired, the line 30 can be established of copper tubing or the like.

The other or outer end of the hose 30 is provided with a standard male fuel line fitting 31.

In addition to the foregoing, the structure that I provide includes mounting means M, which means includes an elongate, flexible support column or member 40 having one end fixed to the tank T and having a mounting head 41 at its other or outer end.

The support member 40 can, as illustrated, be established of flex tubing, or, if desired, can be established of heavy copper tubing. Still further, if desired, the member 40 could be established of plastic jacketed soft, malleable wire, such as copper wire.

In the case illustrated, the inner end of the member 40 is secured and fixed to one end wall 11 of the tank T, as illustrated in FIG. 2 of the drawings.

In the case illustrated, a suitable mounting pin 42, on which the inner end of the member 40 is slidably engaged, is fixed to and projects axially outwardly from the end wall 11 of the tank T. The pin 42 is shown provided with a flange portion at its inner end, which flange portion occurs adjacent the end wall 11 of the tank and is secured thereto by solder or brazing. The inner end of the member 40 stops against the flange and is fixed thereto as by soldering or braising.

The mounting head 41 at the outer end of the member 40 has an inner cylindrical end portion 43 defining an inwardly opening socket 44 in which the outer end of the member 40 is slidably engaged.

The outer end of the member 40 is fixed in the socket in the inner end portion of the head by welding or braising.

The mounting head is further provided with a flat tab-like outer end portion 45, which portion is bifurcated by a central, longitudinal outward opening notch or slot 46. The notch or slot 46 cooperates with the tab to define a pair of longitudinally outwardly extending prongs 47, which prongs, for the purpose of illustration, project horizontally outwardly and have flat top and bottom surfaces 48 and 49. The outer terminal ends of the prongs 47 are provided with upwardly turned retainer hooks or ears 50.

In operation, and as illustrated in FIG. 3 of the drawings, the mounting head 41 is adapted to be related to a selected bolt or screw type fastener within the engine compartment of a motor vehicle. In the case illustrated, I have shown the head related to a nut 51 engaged on a stud 52 projecting from a support structure 53. Such a fastener structure may, for example, be one of the fastening means employed to hold or secure a head of an internal combustion engine to its related cylinder block.

When the construction is installed, the nut 51 is loosened sufficiently to permit sliding the front portion 45 of the mounting head between the nut 51 and the support structure 53, with the prongs 47 extending by the opposite sides of the stud 52. When the head is thus related to the fastener means, the nut is advanced down into tight clamped engagement with the mounting head and serves to hold it fixed. The hooks or ears 50 on the prongs 47, as illustrated in FIG. 3 of the drawings, engage the nut 51 in such a manner as to prevent the head from being inadvertently pulled from engagement between the support structure and the nut and also engage the nut in such a manner as to prevent the head from rotating or pivoting beneath the nut, when the structure is in use.

In practice, the tank T is of small volume, for instance, the tank is adapted to carry approximately one quart of gasoline. It has been determined that one quart of gasoline is a sufficient quantity to start a motor vehicle which is stalled as a result of failure of the fuel supply system and to drive the car two or three miles. A distance of two or three miles is more than adequate to drive a vehicle out of a traffic jam, or the like, and to a garage or service station.

By limiting the volume and the resulting weight of fuel, to be handled by my new apparatus, it is possible to properly support the tank by support means, such as disclosed and it is possible to maintain the size and configuration of the tank within limits which permit arranging a tank within the engine compartment of all standard or conventional automobile constructions.

When an automobile has stalled, as a result of unobvious and undetermined cause, a serviceman first checks the electrical distributor system by turning the engine over by means of the starter and bridging and shorting out a spark plug wire. If an electric arc is generated, it is reasonably certain that the distributor system is in order and that one of the three above-noted causes of failure in the fuel supply system will likely be found.

When my new construction is to be used, and it is determined that the automobile has stalled as a result of failure in the fuel supply system, the head of the mounting means M is secured to a supporting structure within the engine compartment in the manner illustrated in FIG. 3 of the drawings and described above. The male fuel line fitting 15' on the fuel line F of the engine construction is disengaged from the carburetor C. Next, the fuel line fitting 31 on the hose or line 30 is engaged with the carburetor and in place of the fitting 15'.

Next, the cap 16 on the fitting 15 enclosing the vent in the filler neck cap 13 is removed from the fitting 15 and is engaged on the fitting 15', thereby opening the vent 14 to the tank and closing and sealing the fuel line F.

When the construction is thus mounted in the engine compartment and connected with the carburetor C, the valve is open and fuel within the tank is free to flow, by gravity, to the carburetor C.

With fuel thus being supplied to the carburetor, the engine can be started and the vehicle driven a limited distance for the purpose of removing it from traffic and for the purpose of making permanent repair on correction of the fuel system.

It will be apparent that the mounting means is such that the tank T can be elevated above the carburetor to assure gravity feed of fuel to the carburetor in the manner set forth above.

Further, the mounting means is such that the tank can, if necessary, be initially positioned a considerable distance above the carburetor and in an area which would be outside of the engine compartment, for the purpose of initiating flow and starting the engine. This can only be accomplished when the hood H of the automobile is, as illustrated in FIG. 1 of the drawings, in an up or open position.

After the engine has been started, the hood H can be lowered to its down or closed position. If the tank T is positioned too high, the mounting means M is such that when the hood is lowered to its closed position, it will urge or push the tank down, as required, without damage to any structure involved.

It will be apparent from the foregoing that the construction that I provide is such that it can be easily and quickly applied to an automobile engine in a matter of minutes and is such that it can be removed with equal dispatch.

Having described only a typical preferred form and application of my invention, I do not wish to be limited to the specific details herein set forth, but wish to reserve to myself any modifications and/or variations that may appear to those skilled in the art and which fall within the scope of the following claims:

Having described my invention, I claim:

1. An emergency fuel tank of the character referred to including, a tank having top and bottom sides and ends, an upwardly projecting tubular filler neck at and communicating with the top side of the tank, a closure engageable with and normally closing the neck, an outlet opening at the bottom side of the tank, an elongate flexible fuel conducting hose having inner and outer ends, means coupling the inner end of the hose to the tank to communicate with the outlet opening, a male fuel line connector fitting at the outer end of the host and adapted to engage in the fuel inlet opening in a carburetor and mounting means to mount the tank in the engine compartment in a motor vehicle and including an elongate flexible column having inner and outer ends, anchoring means securing the inner end of the column to the tank and a mounting head fixed to the outer end of the column, said mounting head being a flat mounting tab adapted to be engaged between mounting surfaces of a support structure and a related screw fastener within the engine compartment.

2. A structure as set forth in claim 1, wherein said means coupling the inner end of the hose to the tank includes a normally closed valve having an inlet nipple fixed to the tank and communicating with the outlet opening, a manually engageable operating stem and an outlet nipple engaged in and communicating with the inner end of the hose.

3. A structure as set forth in claim 1, wherein, said closure includes a cap screw threaded on the neck, said cap having a vent opening, an outwardly projecting fitting fixed to the cap in connection with the vent opening, said fitting having screw threads corresponding with the threads corresponding with the threads of a male fuel line connector fitting; and a sealing cap normally engaged on and sealing the vent and adapted to be engaged on the male fuel line fitting of an engine with which the structure is related.

4. A structure as set forth in claim 1, wherein said means coupling the inner end of the hose to the tank includes a normally closed valve having an inlet nipple fixed to the tank and communicating with the outlet opening, a manually engageable operating stem and an outlet nipple engaged in and communicating with the inner end of the hose, said closure includes a cap screw threaded on the neck, said cap having a vent opening, an outwardly projecting fitting fixed to the cap in connection with the vent opening, said fitting having screw threads corresponding with the threads of a male fuel line connector fitting; and a sealing cap normally engaged on and sealing the vent and adapted to be engaged on the male fuel line fitting of an engine with which the structure is related.

5. A structure as set forth in claim 1, wherein said mounting tab is slotted to receive the shank of a related screw fastener and to define spaced flat prongs to project by the opposite sides of the shank and beyond the fastener structure, the ends of the prongs having ears bent at right angles to the plane of the tab to engage parts of the fasteners structure and to prevent displacement of the mounting means and rotation of the head relative to said parts.

6. A structure as set forth in claim 1, wherein said means coupling the inner end of the hose to the tank includes a normally closed valve having an inlet nipple fixed to the tank and communicating with the outlet opening, a manually engageable operating stem and an outlet nipple engaged in and communicating with the inner end of the hose, said mounting tab being slotted to receive the shank of a related screw fastener and to define spaced flat prongs to project by the opposite sides of the shank and beyond the fastener structure, the ends of the prongs having ears bent at right angles to the plane of the tab to engage parts of the fastener structure and to prevent displacement of the mounting means and rotation of the head relative to said parts.

7. A structure as set forth in claim 1, wherein, said closure includes a cap screw threaded on the neck, said cap having a vent opening, an outwardly projecting fitting fixed to the cap in connection with the vent opening, said fitting having screw threads corresponding with the threads of a male fuel line connector fitting; and a sealing cap normally engaged on and sealing the vent and adapted to be engaged on the male fuel line fitting of an engine with which the structure is related, said mounting tab being slotted to receive the shank of a related screw fastener and to define spaced flat prongs to project by the opposite sides of the shank and beyond the fastener structure, the ends of the prongs having ears bent at right angles to the plane of the tab to engage parts of the fasteners structure and to prevent displacement of the mounting means and rotation of the head relative to said parts.

8. A structure as set forth in claim 1, wherein said means coupling the inner end of the hose to the tank includes a normally closed valve having an inlet nipple fixed to the tank and communicating with the outlet opening, a manually engageable operating stem and an outlet nipple engaged in and communicating with the inner end of the hose, said closure includes a cap screw threaded on the neck, said cap having a vent opening, an outwardly projecting fitting fixed to the cap in connection with the vent opening, said fitting having screw threads corresponding with the threads of a male fuel line connector fitting; and a sealing cap normally engaged on and sealing the vent and adapted to be engaged on the male fuel line fitting of an engine with which the structure is related, said mounting tab being slotted to receive the shank of a related screw fastener and to define spaced flat prongs to project by the opposite sides of the shank and beyond the fastener structure, the ends of the prongs having ears bent at right angles to the plane of the tab to engage parts of the fasteners structure and to prevent displacement of the mounting means and rotation of the head relative to said parts.

9. A structure as set forth in claim 1, wherein said means coupling the inner end of the hose to the tank includes a normally closed valve having an inlet nipple fixed to the tank and communicating with the outlet opening, a manually engageable operating stem and an outlet nipple engaged in and communicating with the inner end of the hose, said column including a length of flexible conduit which requires greater force to bend than the combined weight of the tank, a volume of fuel carried thereby, the hose and the other elements and parts directly related thereto.

10. A structure as set forth in claim 1, wherein said means coupling the inner end of the hose to the tank includes a normally closed valve having an inlet nipple fixed to the tank and communicating with the outlet opening, a manually engageable operating stem and an outlet nipple engaged in and communicating with the inner end of the hose, said closure includes a cap screw threaded on the neck, said cap having a vent opening, an outwardly projecting fitting fixed to the cap in connection with the vent opening, said fitting having screw threads corresponding with the threads of a male fuel line connector fitting; and a sealing cap normally engaged on and sealing the vent and adapted to be engaged on the male fuel line fitting of an engine with which the structure is related, said mounting tab being slotted to receive the shank of a related screw fastener and to define spaced flat prongs to project by the opposite sides of the shank and beyond the fastener structure, the ends of the prongs having ears bent at right angles to the plane of the tab to engage parts of the fasteners structure and to prevent displacement of the mounting means and rotation of the head relative to said parts, said column including a length of flexible conduit which requires greater force to bend than the combined weight of the tank, a volume of fuel carried thereby, the hose and the other elements and parts directly related thereto.

References Cited

UNITED STATES PATENTS

| | | | |
|---|---|---|---|
| 1,445,829 | 2/1923 | Fischer | 248—160 X |
| 1,465,189 | 8/1923 | Stewart | 158—46.5 |
| 1,853,970 | 4/1932 | Gauthier. | |
| 2,389,685 | 11/1945 | Pike | 158—46.5 |
| 2,905,327 | 9/1959 | Phillips | 158—46 X |
| 2,981,322 | 4/1961 | Schum | 158—46.5 X |
| 3,148,670 | 9/1964 | Fiedler et al. | 158—36 |

FREDERICK KETTERER, *Primary Examiner.*